United States Patent
Li

(10) Patent No.: US 9,911,588 B1
(45) Date of Patent: Mar. 6, 2018

(54) METHODS AND SYSTEMS FOR QUANTITATIVE MASS ANALYSIS

(71) Applicant: Thermo Finnigan LLC, San Jose, CA (US)

(72) Inventor: Linfan Li, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 15/455,857

(22) Filed: Mar. 10, 2017

(51) Int. Cl.
*H01J 49/00* (2006.01)
*H01J 49/42* (2006.01)

(52) U.S. Cl.
CPC ........ *H01J 49/423* (2013.01); *H01J 49/0031* (2013.01); *H01J 49/0045* (2013.01)

(58) Field of Classification Search
CPC ... H01J 49/423; H01J 49/0045; H01J 49/0031
USPC .......................... 250/281, 282, 288, 290–293
See application file for complete search history.

(56) References Cited

U.S. PATENT DOCUMENTS

| | | | |
|---|---|---|---|
| 6,147,348 A | 11/2000 | Quarmby | |
| 7,569,813 B2 * | 8/2009 | Hager | H01J 49/0009 250/252.1 |
| 7,692,142 B2 | 4/2010 | Schwartz et al. | |
| 8,258,462 B2 | 9/2012 | Remes | |
| 8,415,617 B2 | 4/2013 | Schwartz | |
| 9,048,074 B2 | 6/2015 | Senko | |
| 2005/0092910 A1 * | 5/2005 | Geromanos | C12Q 1/6872 250/282 |
| 2011/0240844 A1 * | 10/2011 | Ouyang | H01J 49/0404 250/282 |
| 2012/0223223 A1 * | 9/2012 | Sugiyama | H01J 49/0031 250/282 |
| 2014/0364337 A1 * | 12/2014 | Hermanson | G01N 33/60 506/12 |
| 2016/0181077 A1 * | 6/2016 | Ouyang | H01J 49/0422 250/282 |
| 2016/0336163 A1 | 11/2016 | Remes et al. | |

OTHER PUBLICATIONS

Schwartz et al., "A Two-Dimensional Quadrupole Ion Trap Mass Spectromter," J. Am. Soc. Mass. Spectrom., 13, 659-669, 2002.

\* cited by examiner

*Primary Examiner* — Michael Maskell
(74) *Attorney, Agent, or Firm* — A. J. Gokcek

(57) ABSTRACT

A method of quantitative mass analysis of precursor species of different mass-to-charge (m/z) ratios from a single or the same ion injection event is disclosed. A plurality of precursor ion species having different respective m/z ratios are introduced into a mass spectrometer at the same time. The precursor ion species are isolated. A first subset of the isolated precursor ions having a first m/z ratio is fragmented and analyzed. A second subset of the isolated precursor ions having a second m/z ratio is fragmented and analyzed. A first mass spectrum is generated for the fragment ions of the first subset of precursor ions, and a second mass spectrum is generated for the fragment ions of the second subset of precursor ions.

13 Claims, 8 Drawing Sheets

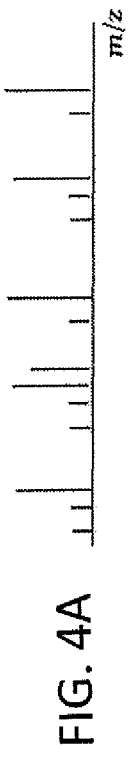
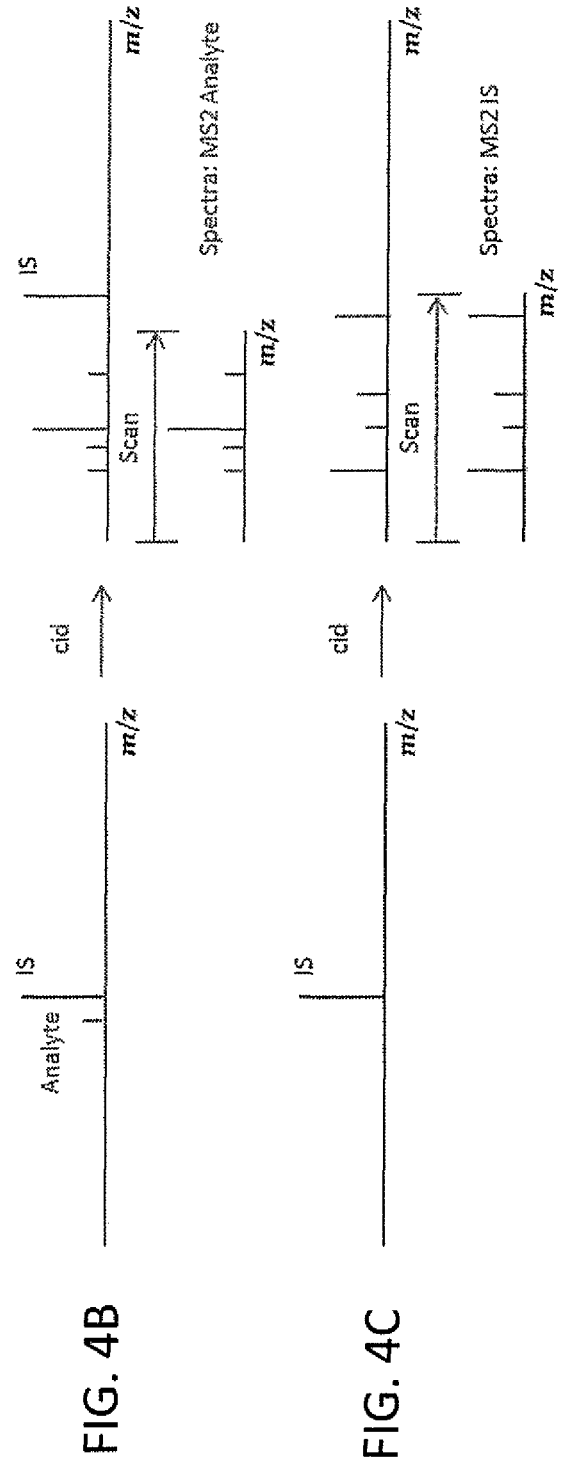
FIG. 4A
FIG. 4B
FIG. 4C

METHODS AND SYSTEMS FOR QUANTITATIVE MASS ANALYSIS

FIELD OF THE INVENTION

This invention relates to mass spectrometry based quantitative analysis. More specifically, this invention relates to quantitative mass analysis of product ions derived from multiple precursor species of different mass-to-charge (m/z) ratios injected into an ion trap mass analyzer in the same ion injection event.

BACKGROUND OF THE INVENTION

Conventional methods of quantitative mass analysis using ion trap mass spectrometers require the analyte and corresponding internal standard ions to be injected and analyzed from two time-separated ion injection events. Any fluctuations in the ionization process which occur in between those two ion injection events introduces inaccuracy in the quantitative mass analysis for that particular measurement and subsequently leads to a bigger relative standard deviation (RSD) and uncertainty in such measurements.

What is needed is a quantitative mass analysis method that minimizes or eliminates errors introduced by the fluctuations in the ionization process and improves the uncertainty in the measurement.

SUMMARY

Embodiments of the present invention provide methods, systems, and apparatuses for quantitative mass analysis using ion trap mass analyzers. In one embodiment of the present invention, a method of operating an ion trap mass analyzer for quantification of analytes in a sample is provided. The analytes may comprise, in various implementations, therapeutic drugs or their metabolites, drugs of abuse or their metabolites, and endogenous substances such as creatinine. The method includes introducing sample ions into the ion trap mass analyzer. The sample ions, which are introduced into the ion trap in a single common ion injection event or multiple common ion injection events, include first precursor ions having a first mass-to-charge ratio (m/z) range and second precursor ions having a second m/z range. The method also includes m/z isolating both the first precursor ions and the second precursor ions such that after the isolation or isolations are effected only ions within the first precursor m/z range and the second precursor m/z range remain in the ion trap, and initially fragmenting (dissociating) the first precursor ions, but not the second precursor ions, to generate first product ions. The method further includes performing a first m/z analysis scan to m/z-sequentially or m/z-selectively eject the first product ions to a detector to acquire a first mass spectrum including the first product ions. The first m/z analysis scan comprises varying at least one operating parameter of the ion trap mass analyzer (for example, the amplitude of the radio-frequency (RF) trapping voltage applied to the ion trap electrodes) from a start point to an endpoint. The endpoint of the first scan is set such that the second precursor ions are retained in the ion trap mass analyzer, rather than being ejected therefrom or dissociated. The method also includes subsequently fragmenting (dissociating) the second precursor ions to generate second product ions and performing a second m/z analysis scan by m/z-sequentially or m/z-selectively ejecting the second product ions to the detector to acquire a second mass spectrum including the second product ions.

The second m/z analysis scan also comprises varying at least one operating parameter of the ion trap mass analyzer—for example, the amplitude of the radio-frequency (RF) trapping voltage applied to the ion trap electrodes—from a start point to an endpoint. The amount of the analyte in the sample may be determined using intensities of the product ions in the first mass spectrum and the second mass spectrum. The first product ions in the first product ion m/z spectrum and the second product ions in the second product ion m/z spectrum are derived from precursor ions delivered to the ion trap in one or more common ion injection events.

In one embodiment, the first precursor ions are analyte precursor ions, and the second precursor ions are internal standard precursor ions. In another embodiment, the first precursor ions are internal standard precursor ions, and the second precursor ions are analyte precursor ions.

A multi-notched broadband excitation waveform voltage may be applied to concurrently m/z isolate the first precursor ions and the second precursor ions.

The ions may be fragmented using ion trap type collision-induced dissociation (IT CID). Using a first IT CID step, a first excitation waveform voltage with one or more frequency components may be applied to the ion trap electrodes to produce a corresponding first excitation waveform field superposed on the ion confinement field or fields of the ion trap. This first excitation waveform field couples to a frequency component of the unforced or natural oscillatory motion of the first precursor ions in the trapping field, causing the first precursor ions to pick up kinetic energy from the excitation waveform field and undergo energetic collisions with molecules of a background gas causing dissociation of the first precursor ions to produce first product ions. The first excitation waveform field couples sufficiently weakly or negligibly to all of the frequency components of the unforced or natural oscillatory motion of the second precursor ions in the trapping field(s) such that the second precursor ions are kinetically excited insufficiently to cause the second precursor ions to remain trapped, intact and negligibly diminished in number.

Also, after the first mass spectrum is acquired, there is a second IT CID step to fragment (dissociate) the second precursor ions which may involve application of a second excitation waveform voltage with one or more frequency components applied to the ion trap electrodes to produce a corresponding second excitation waveform field superposed on the ion confinement field or fields of the ion trap. This second excitation waveform field couples to a frequency component of the unforced or natural oscillatory motion of the second precursor ions in the trapping field and undergo energetic collisions with molecules of a background gas causing dissociation of the second precursor ions to produce second product ions.

In another embodiment of the present invention, an ion trap mass spectrometer adapted for quantitative mass analysis of precursor species of different mass-to-charge (m/z) ratios from the same ion injection event is provided. The mass spectrometer includes an ion source configured so as to generate a plurality of precursor ion species having different respective m/z ratios. The mass spectrometer also includes an ion trap mass analyzer positioned to receive the precursor ions, to isolate the precursor ion species, and to fragment a first subset of the isolated precursor ions having a first m/z ratio range and a second subset of the isolated precursor ions having a second m/z ratio range, wherein these isolated first and second precursor ions are generated collectively at the same time in the ionization source. The ion trap m/z analyzer is operated so as to obtain a first product ion m/z spectrum comprised almost exclusively of ions derived from the first precursor m/z ratio range (dissociation product ions/fragment ions of the first subset of precursor ions) and a second product ion m/z spectrum comprised almost exclusively of ions derived from the second precursor m/z ratio range (dissociation product ions/fragment ions of the second subset of precursor ions).

BRIEF DESCRIPTION OF THE DRAWINGS

FIGS. 4A-4C show a series histogram or m/z spectra illustrating the evolution of the populations of ions confined within an ion trap m/z analyzer or as well as those ejected in m/z analysis scans from the ion trap m/z analyzer during the performance of a method in accordance with the present invention.

FIG. 4A shows a conceptual depiction of the population of collectively ionized multiple potential precursor species of different m/z ratios confined in an ion trap subsequent to a common or the same ion injection event.

FIG. 4B depicts the retained population of the precursor ions of the analyte and internal standard after the background ions are ejected in the process of ion isolation (left side of FIG. 4B). After CID of the analyte ions, product ions are formed and are scanned to produce an analyte product ion m/z spectrum (right side of FIG. 4B).

FIG. 4C illustrates that subsequent to the acquisition of the mass spectrum of the analyte precursor ions in FIG. 4B, the precursor ions of the internal standard remain isolated (left side of FIG. 4C) and, after CID of the internal standard precursor ions, a mass spectrum of the product ions of the internal standard precursor ions is obtained (right side of FIG. 4C).

DETAILED DESCRIPTION OF EMBODIMENTS

Figure 1:
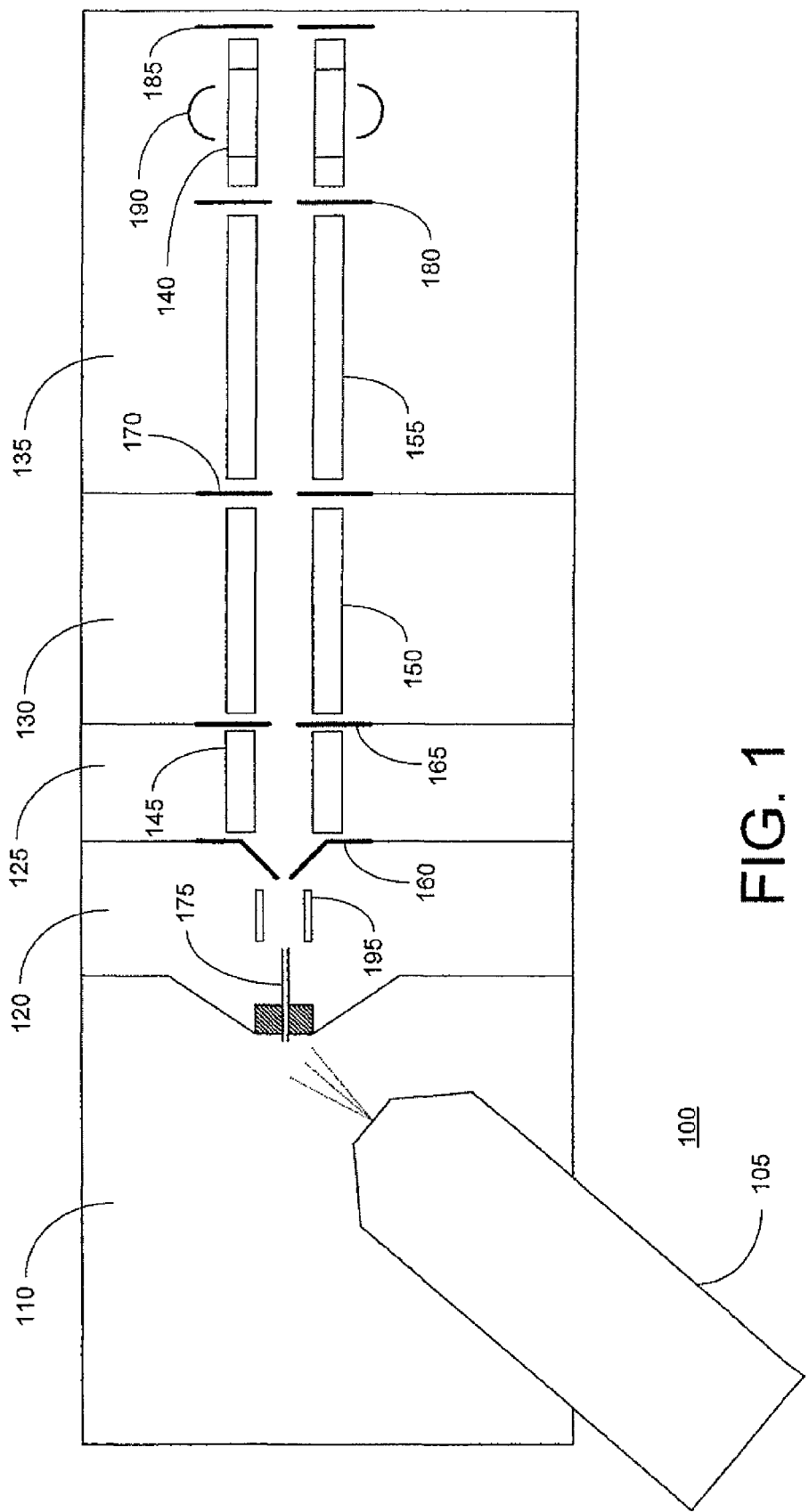
FIG. 1 is a schematic diagram of an ion trap mass spectrometer which may be operated in accordance with methods and systems embodying the present invention.

FIG. 1 illustrates an example of an ion trap mass spectrometer 100 which may be operated in accordance with embodiments of the present invention. It will be understood that certain features and configurations of mass spectrometer 100 are presented by way of illustrative examples, and should not be construed as limiting the methods of the present invention to implementation in a specific environment. An ion source, which may take the form of a conventional electrospray ion source 105, generates ions from a sample material. In other implementations, the ion source may take the form of a direct sampling ion source such as the Paper Spray ionization system available from Prosolia (Indianapolis, Ind.), in which a sample (e.g., a biological fluid such as blood or plasma) is deposited on a porous wicking material (e.g., paper) and elctrosprayed from a tip of the material.

The ions are transported from ion source chamber 110, which for an electrospray source will typically be held at or near atmospheric pressure, through several intermediate vacuum chambers 120, 125 and 130 of successively lower pressure, to a vacuum chamber 135 in which ion trap 140 resides. Efficient transport of ions from ion source 105 to ion trap 140 is facilitated by a number of ion optic components, including quadrupole RF ion guides 145 and 150, octopole RF ion guide 155, skimmer 160, tube lens 195 and electrostatic lenses 165 and 170. Ions may be transported between ion source chamber 110 and first intermediate chamber 120 through an ion transfer tube 175 that is heated to evaporate residual solvent and break up solvent-analyte clusters. Intermediate chambers 120, 125 and 130 and vacuum chamber 135 are evacuated by a suitable arrangement of pumps to maintain the pressures therein at the desired values. In one example, intermediate chamber 120 communicates with a port of a mechanical pump (not depicted), and intermediate pressure chambers 125 and 130 and vacuum chamber 135 communicate with corresponding ports of a multistage, multiport turbo-molecular pump (also not depicted). Ion trap 140 includes axial trapping electrodes 180 and 185 (which may take the form of conventional plate lenses) positioned axially outward from the ion trap electrodes to assist in the generation of a potential well for axial confinement of ions, and also to effect controlled gating of ions into the interior volume of ion trap 140 in order to regulate the filling (injection) time of ion trap 140; for example, DC offset voltages applied to axial trapping electrode 180 (and/or electrodes located upstream in the ion path relative to axial trapping electrode 180) may be set to selectively allow or block the flow of ions into ion trap 140. A damping/collision gas inlet (not depicted), coupled to a source of an inert gas such as helium or argon, will typically be provided to controllably add a damping/collision gas to the interior of ion trap 140 in order to facilitate ion trapping, fragmentation and cooling. Ion trap 140 is additionally provided with at least one set of ion detectors 190 (wherein each set may consist of a single detector or multiple detectors) that generate a signal representative of the abundance of ions ejected from the ion trap.

Ion trap 140, as well as other components of mass spectrometer 100, communicate with and operate under the control of a data and control system (not depicted), which will typically include a combination of one or more general purpose computers and application-specific circuitry and processors. Generally described, the data and control system acquires and processes data and directs the functioning of the various components of mass spectrometer 100. The data and control system will have the capability of executing a set of instructions, typically encoded as software or firmware, for carrying out the analysis methods described herein.

Figure 2:
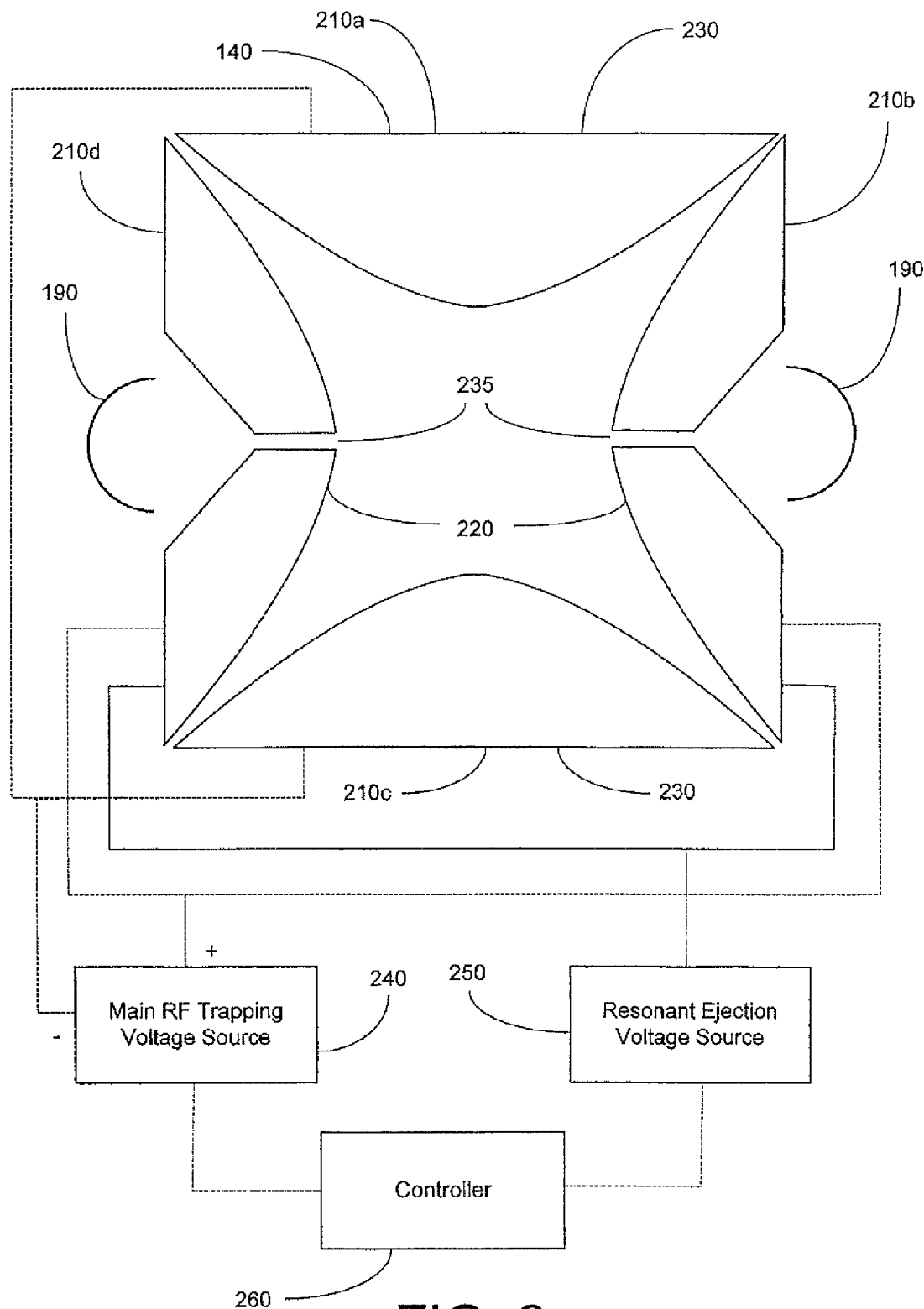
FIG. 2 is a lateral cross-sectional view of a two-dimensional radial ejection ion trap mass analyzer which may be used to implement methods and systems embodying the present invention.

FIG. 2 depicts a cross-sectional view of ion trap 140, which may be constructed as a conventional two-dimensional ion trap of the type described by Schwartz et al. in "A Two-Dimensional Quadrupole Ion Trap Mass Spectrometer", J. Am. Soc. Mass Spectrometry, 13: 659-669 (2002). Ion trap 140 includes four elongated electrodes 210$a$, 210$b$, 210$c$, 210$d$, each electrode having an inwardly directed hyperbolic-shaped surface, arranged in two electrode pairs 220 and 230 aligned with and opposed across the trap centerline. The electrodes of one electrode pair 220 are each adapted with an aperture (slot) 235 extending through the thickness of the electrode in order to permit ejected ions to travel through the aperture to an adjacently located detector 190. A main RF trapping voltage source 240 applies opposite phases of an RF voltage to electrode pairs 220 and 230 to establish an RF trapping field that radially confines ions within the interior of ion trap 140. During m/z analysis scans, resonant ejection voltage source 250 applies an oscillatory voltage across apertured electrode pair 220 to create a dipole excitation field. The amplitude of the applied main trapping RF voltage is ramped such that ions come into resonance with the excitation field in order of their m/z's. The resonantly or near resonantly excited ions develop unstable trajectories and are ejected through apertures 235 to detectors 190. Control of the main RF trapping voltage, resonant ejection voltage, and CID excitation voltage applied to electrodes of ion trap 140, specifically adjustment of their amplitudes, is effected by a controller 260 that forms part of the data and control system.

While FIG. 2 depicts a conventionally arranged and configured two-dimensional ion trap, practice of the invention should not be construed as being limited to any particular ion trap geometry or configuration. In an alternative implementation, the ion trap may take the form of a symmetrically stretched, four-slotted ion trap of the type described in the U.S. Pat. No. 8,415,617 by Jae C. Schwartz and entitled "Two-Dimensional Radial-Ejection Ion Trap Operable as a Quadrupole Mass Filter", the disclosure of which is herein incorporated by reference. The ion trap may also constitute a part of a dual ion trap mass analyzer structure disclosed in U.S. Pat. No. 7,692,142 for "Differential-Pressure Dual Ion Trap Mass Analyzer and Methods of Use Thereof" by Jae C. Schwartz et al, which is also incorporated herein by reference. The methods described herein may also be utilized in connection with conventional rotationally symmetric three-dimensional ion traps (including variants such as toroidal or cylindrical ion traps) as well as for rectilinear ion traps.

Figure 3:
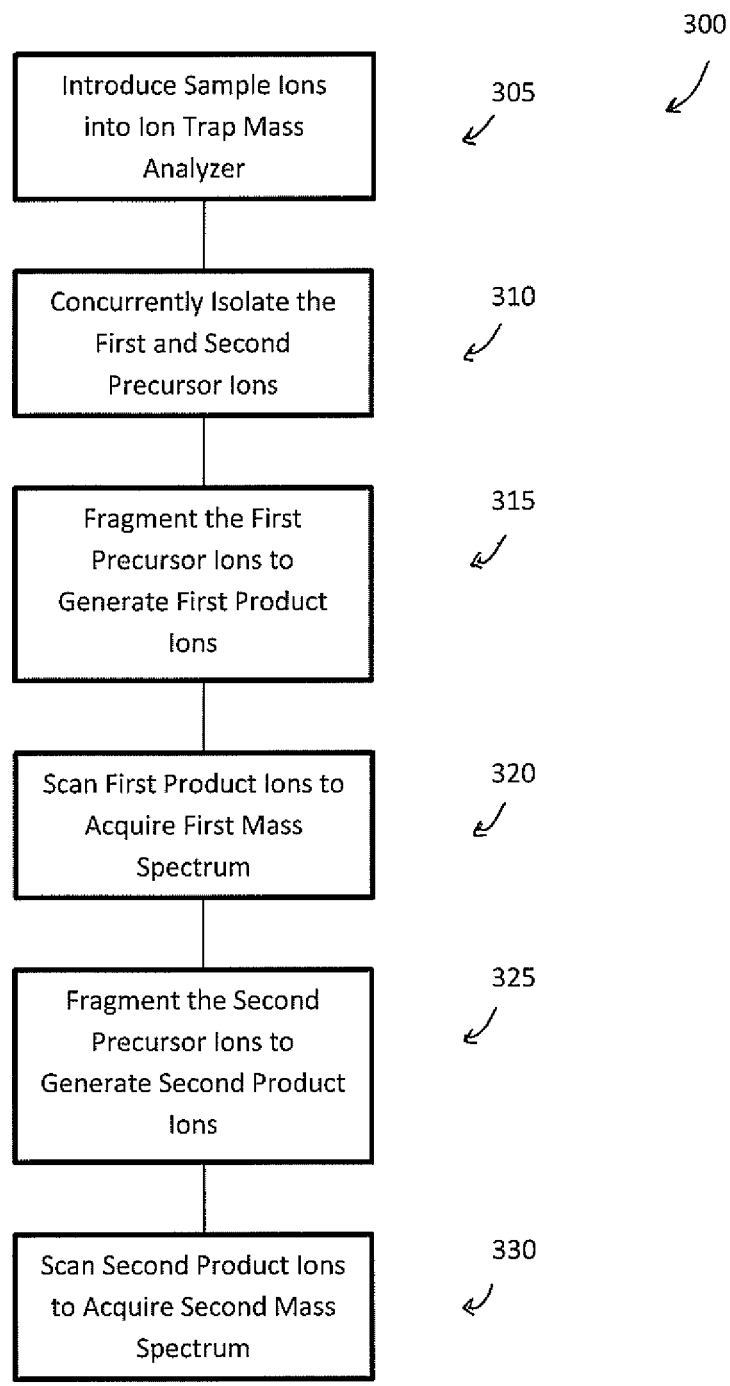
FIG. 3 is a flowchart depicting steps of a method of operating an ion trap mass analyzer for quantification of analytes in a sample, in accordance with one embodiment of the present invention.

FIG. 3 is a flowchart 300 depicting steps of a method of operating an ion trap mass analyzer for quantification of analytes in a sample, in accordance with one embodiment of the present invention. In certain implementations, the sample may take the form a biological fluid, such as blood, plasma, saliva, or urine, or fraction thereof, or an extract from a biological tissue sample. The analyte may comprise, for example, a therapeutic drug or its metabolite, a drug of abuse or its metabolite, or an endogenous substance, such as creatinine or a steroid hormone. In step 305, sample ions, generated by the ionization source by ionizing molecules in the sample by an appropriate technique, are introduced into an ion trap mass analyzer. The sample ions include first precursor ions having a first m/z and second precursor ions having a second m/z, different from the first m/z. In one specific embodiment, the first precursor ions are analyte precursor ions, and the second precursor ions are internal standard precursor ions. As is known in the art, the internal standard from which the internal precursor ions are generated may consist of an isotopologue (e.g., a deuterated version) of the corresponding analyte. While the description set forth below discusses quantification of a single analyte, variants of this technique may quantify multiple analytes (e.g., a panel of two or more therapeutic drugs). Alternatively, the first precursor ions can be internal standard precursor ions, while the second precursor ions can be analyte precursor ions. In a preferred mode, the first precursor ions and the second precursor ions are introduced into the ion trap mass analyzer from a common injection event, i.e. the first and second precursor ions both enter the ion trap during a period defined by an injection start time (when the applied DC voltage(s) is/are set to allow the passage of ions into the ion trap) and an injection end time (when the applied DC voltage(s) is/are switched to a value that blocks the passage of ions into the ion trap).

During and/or following the introduction of ions including the first and second precursor ions into the ion trap, the first precursor ions and the second precursor ions are isolated concurrently (step 310) by removing ions having m/z's other than those of the first and second precursor ions. As is known in the art, this operation is performed by applying oscillatory voltages to the ion trap electrodes to establish an electric field that kinetically excites the non-desired ions (those other than the first and second precursor ions) such that the excited ions are ejected from the ion trap or are neutralized via collisions with electrode surfaces. In one illustrative implementation, concurrent isolation of the first and second precursor ions is achieved by applying a notched multifrequency waveform voltage to the trap electrodes, as described in U.S. Pat. No. 9,048,074. In such waveforms, the frequency notches are set to correspond to the secular frequencies of the ions to be isolated, such that those ions are not sufficient kinetically excited to cause their ejection or dissociation. Next, in step 315, the first precursor ions, but not the second precursor ions, are fragmented to generate first product ions. Fragmentation may be carried out using collision induced dissociation (CID) by applying an excitation waveform with a frequency which closely matches a secular frequency of the first precursor ions but is sufficiently different from the secular frequency of the second precursor ions to avoid substantial resonant excitation thereof. In this manner, at least a portion of the first precursor ions undergo energetic collisions with atoms or molecules of collision gas (also referred to as background or damping gas), causing them to fragment into first product ions, whereas the second precursor ions remain substantially unfragmented.

Figure 8:
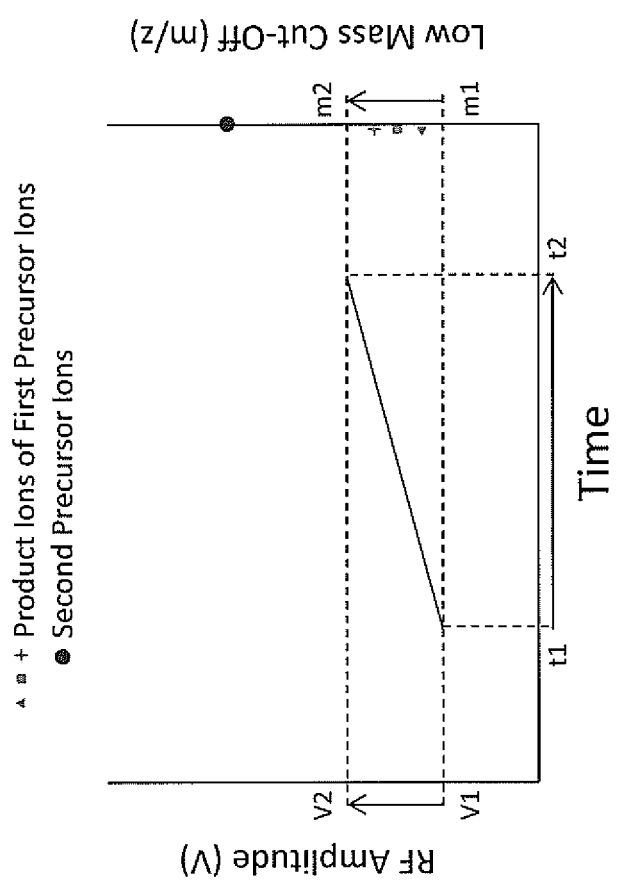
FIG. 8 is a graph illustrating a ramping sequence of the amplitude of the trapping RF voltage for practical implementation of an analytical scan to mass sequentially detect product ions having different mass-to-charge (m/z) ratios in a range m1 to m2.

Next, in step 320, a first analytical scan is performed to mass-sequentially eject the first product ions to the detector of the ion trap mass analyzer and thereby acquire a first mass spectrum that includes the first product ions. As is known in the art and is discussed above, an analytical scan may be conducted in an ion trap mass analyzer by the resonant ejection method, in which a dipole excitation field is established within the ion trap, and a parameter of the RF trapping field is ramped (progressively varied) such that ions come into resonance with the excitation field in order of their m/z's, with the resonantly excited ions being ejected to a detector. Per the Mathieu equation, which characterizes ion motion in an oscillatory field, the secular frequency of ion motion is approximately proportional to the amplitude of the applied RF trapping voltage, and inversely proportional to the ion's m/z. An analytical scan is commonly performed by linearly ramping the applied RF trapping amplitude between a start point and an endpoint, such that the secular frequencies of the trapped ions are concomitantly varied. Alternatively, an analytical scan may be performed by ramping the frequency of the excitation field between a start point and an endpoint. The ramping of the RF trapping voltage amplitude in step 320 is illustrated by the graph appearing in FIG. 8. As depicted, the RF trapping voltage amplitude is linearly varied during the scan from a first value V1 at time t1, to a second value V2 at time t2. The endpoint of the scan (as used herein, the endpoint will refer to the terminal value of the RF trapping field parameter varied during the analytical scan, which in this case is the RF trapping voltage amplitude) is selected such that the scan is terminated after the first precursor ions have been mass selectively ejected, but before the second precursor ions develop a secular frequency that matches the resonant ejection frequency.

Next, in step 325, the second precursor ions, retained in the ion trap mass analyzer, are fragmented to generate second product ions. In one embodiment, fragmentation is carried out using CID by applying an excitation waveform with a frequency that closely matches a secular frequency of the second precursor ions, creating a resonance condition by which the second precursor ions pick up energy and collide with molecules of a background gas and dissociate.

Next, in step 330, a second analytical scan is performed to mass-sequentially detect the second product ions and acquire a second mass spectrum that includes the second product ions. Again as known in the art, the second analytical scan may be performed by ramping the RF trapping voltage amplitude between a start point to another endpoint while applying a resonant excitation voltage to resonantly eject the second product ions to the detector in order of their m/z's.

The results of the foregoing method steps are illustrated by the conceptual spectra depicted in FIGS. 4A-4C. FIG. 4A shows a depiction of multiple precursor species ion of different m/z ratios introduced into an ion trap mass analyzer from the same ion injection event. In this example, the precursor ions selected for $MS^2$ quantitative analysis comprise analyte ions which are of lower m/z compared to the corresponding internal standard ions. FIG. 4B illustrates $MS^2$ analysis of the precursor ions of the analyte. First, ions other than those of the targeted analyte species and its corresponding internal standard are ejected in the process of ion isolation, as shown on the left side of FIG. 4B. As discussed above, a notched multifrequency waveform can be used to isolate the precursor ion species. In one embodiment, the analyte precursor ions and the internal standard precursor ions are concurrently isolated within an ion trap mass analyzer using a notched multifrequency waveform having frequency notches corresponding to the secular frequencies of the analyte and internal standard precursor ions, as is shown.

The analyte precursor ions are then selectively dissociated (for example, using the CID technique with the excitation frequency tuned to match the secular frequency of the analyte ions) and then analyzed by scanning the RF amplitude to eject particular product ions of the analyte to a detector, while the precursor ions of the internal standard are trapped and intact. As discussed above an endpoint of the scan range for the analyte product ions is set such that the internal standard precursor ions are not ejected. A mass spectrum is generated for the product ions of the analyte, as shown on the right side of FIG. 4B.

FIG. 4C illustrates, subsequent to the acquisition of the mass spectrum of the analyte precursor ions in FIG. 4B, mass analysis of product ions produced by fragmentation of the internal standard precursor ions. As shown on the left side of FIG. 4C, the analyte precursor ions have already been fragmented, analyzed and detected, leaving only the internal standard precursor ions. Next, the internal standard precursor ions are selectively dissociated by (for example) the CID technique and a $MS^2$ spectrum is generated for the product ions of the internal standard, as shown on the right side of FIG. 4C, by mass-sequential ejection of ions to the ion trap detector.

As a result, spectra of the product ions of the analyte and internal standard can be obtained using only a single ion accumulation step. The abundance of the product ions of the analyte and the internal standard can be used to calculate the ratio of analyte versus internal standard.

As is known in the art, the quantity of the analyte present in the sample may be calculated using a pre-calibrated relationship between the intensities of one or more characteristic product ions of the analyte appearing in the spectrum produced by the first analytical scan and the intensities of the corresponding characteristic product ions of the internal standard (which is added in a known quantity to the sample) appearing in the spectrum produced by the second analytical scan.

EXPERIMENTAL SECTION

The following examples are set forth to further describe embodiments and aspects of the present invention but are not to be construed as limiting the scope thereof.

Figures 5A, 5B, 5C, 5D:
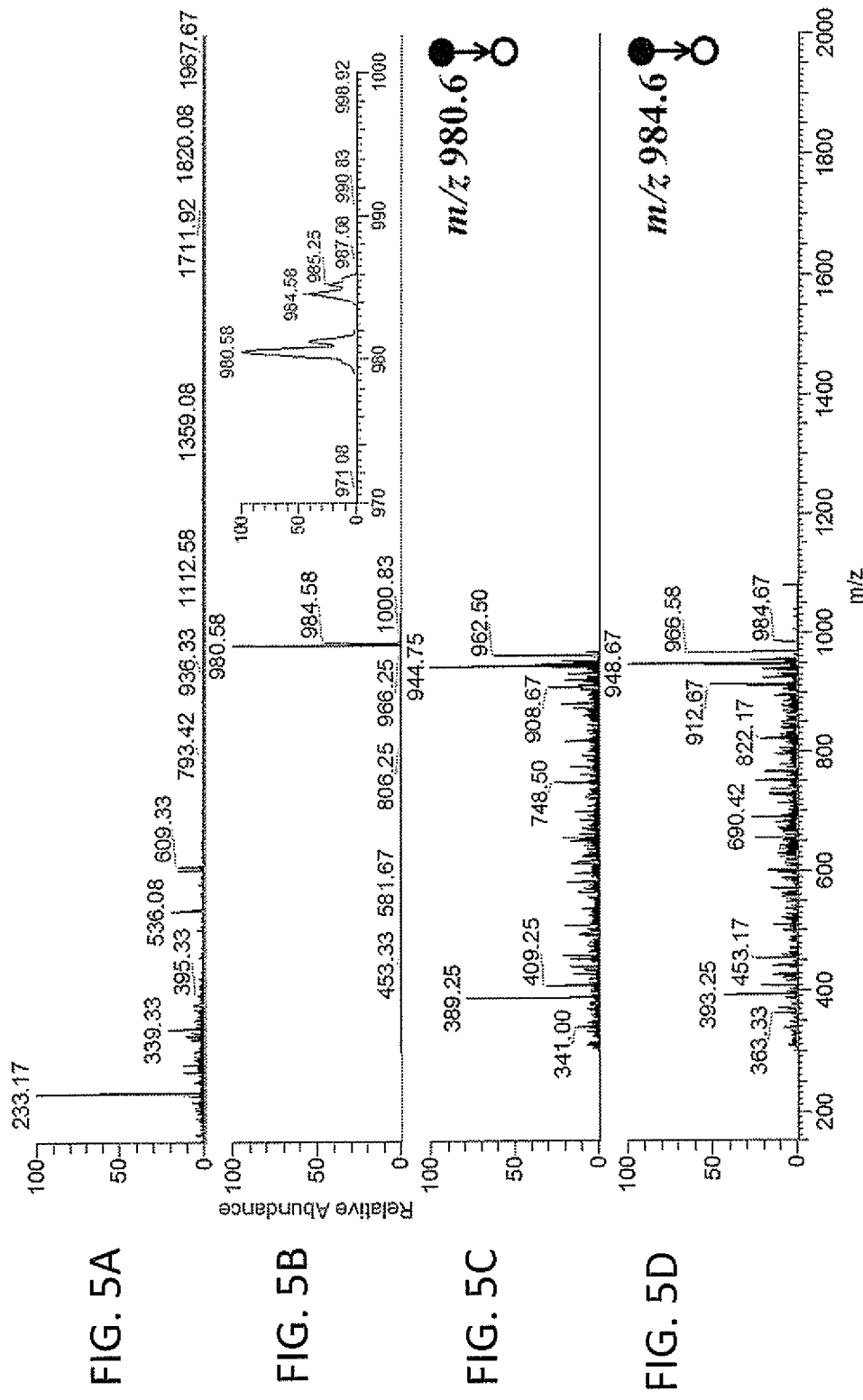
FIG. 5A shows example data for a full scan mass spectrum of an immunosuppressant solution containing precursor ions of everolimus and everolimus-d4, ionized using paper spray ionization.
FIG. 5B shows the sodium adduct precursor molecular ions of everolimus and everolimus-d4 isolated from the background ions, with the insert showing a zoom in on the two isolated m/z peaks.
FIG. 5C shows the $MS^2$ (product ion) m/z spectrum from the sodium adduct precursor ions of everolimus acquired by fragmenting and analyzing the precursor ions at m/z 980.6 using the embodiment of the present invention described in FIGS. 4A-4C.
FIG. 5D shows the $MS^2$ (product ion) spectrum from the sodium adduct precursor ions of everolimus-d4 acquired by fragmenting and analyzing the precursor ions at m/z 984.6 using the embodiment of the present invention described in FIGS. 4A-4C.

FIG. 5A shows a full scan mass spectrum of an immunosuppressant solution containing everolimus and everolimus-d4. In this example, 100 μl of an immunosuppressant solution containing everolimus and everolimus-d4, each at a concentration of 100 ng/ml, was deposited directly onto a disposable Paper Spray cartridge. After depositing the sample directly onto a disposable Paper Spray cartridge, the sample was absorbed into the paper substrate, allowed to dry and inserted into an auto-sampler for generating ions to the mass spectrometer. A high voltage of approximately 4 kV was applied to the paper substrate via a contact on the cartridge to produce an electrospray from the paper tip.

FIG. 5B shows the spectrum of the isolated sodium adduct precursor ions of both everolimus and everolimus-d4. The insert on the right side of FIG. 5B shows a zoom in on the isolated peaks which uses an isolation window width of approximately 2 amu for each peak. Finer isolation can be obtained with a narrower isolation window.

FIG. 5C shows the $MS^2$ spectrum of the sodium adduct everolimus acquired by fragmenting and analyzing only the precursor ions of m/z 980.6. The $MS^2$ spectrum of FIG. 5C was obtained by scanning the RF to an amplitude high enough to eject product ions generated from the sodium adduct of everolimus but still keep the precursor ions of higher m/z, including the sodium adduct of everolimus-d4 (not shown).

After acquisition of the $MS^2$ spectrum of the precursor ions of lower m/z, the precursor ions of higher m/z, everolimus-d4, are fragmented and analyzed as shown in FIG. 5D. By the end of the analysis, precursor ions of different m/z's from the same ion injection events were analyzed respectively.

Figures 6A, 6B:
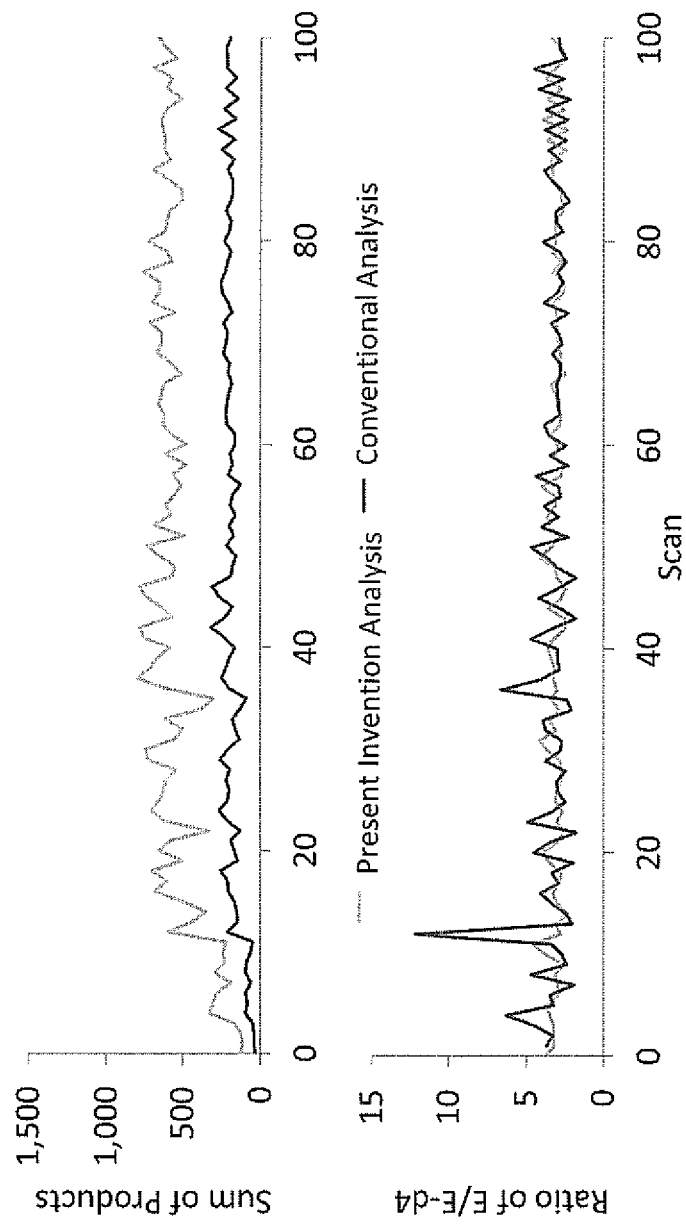
FIG. 6A shows the total product ion intensity of everolimus and everolimus-d4 in a pure sample using paper spray ionization as a function of time/scan number.
FIG. 6B shows the ratio of everolimus/everolimus-d4 total product ion intensities using the embodiment of the present invention described in FIGS. 4A-4C compared to a conventional mass analysis quantitative method involving alternating separate ion injection events and associated product ion scans for everolimus and everolimus-d4.

A set of experiments were conducted to explore the improvement of RSD that could be achieved by practicing embodiments of the present invention. FIG. 6A shows the product ion intensity of 100 ng/ml everolimus and everolimus-d4 pure sample using paper spray ionization. As shown in FIG. 6A, the intensity of product ions of everolimus and everolimus-d4 fluctuated with the use of the PaperSpray ionization technique in this experiment.

FIG. 6B shows the ratio of everolimus/everolimus-d4 using the embodiment of the present invention described above compared to conventional mass analysis involving separate ion injection events for the precursor ions of different m/z ratios. The everolimus/everolimus-d4 ratios calculated—present invention embodiment versus conventional analysis—are plotted against the scan numbers, as shown in FIG. 6B. Improved ratio stability was observed with the embodiment of the present invention. Signal intensities of product ions of 389.25, 409.25, 453.25, 564.25, 582.25, 651.5, 747.5, and 775.5 were summed up to represent the products of everolimus. Signal intensities of product ions of 393.25, 409.25, 453.25, 564.25, 582.25, 655.5, 751.5, and 779.5 were summed up to represent the product ions of everolimus-d4. The comparison of the stability in the everolimus/everolimus-d4 ratios demonstrates lower RSD and thus higher precision for quantitative analysis.

Figure 7:
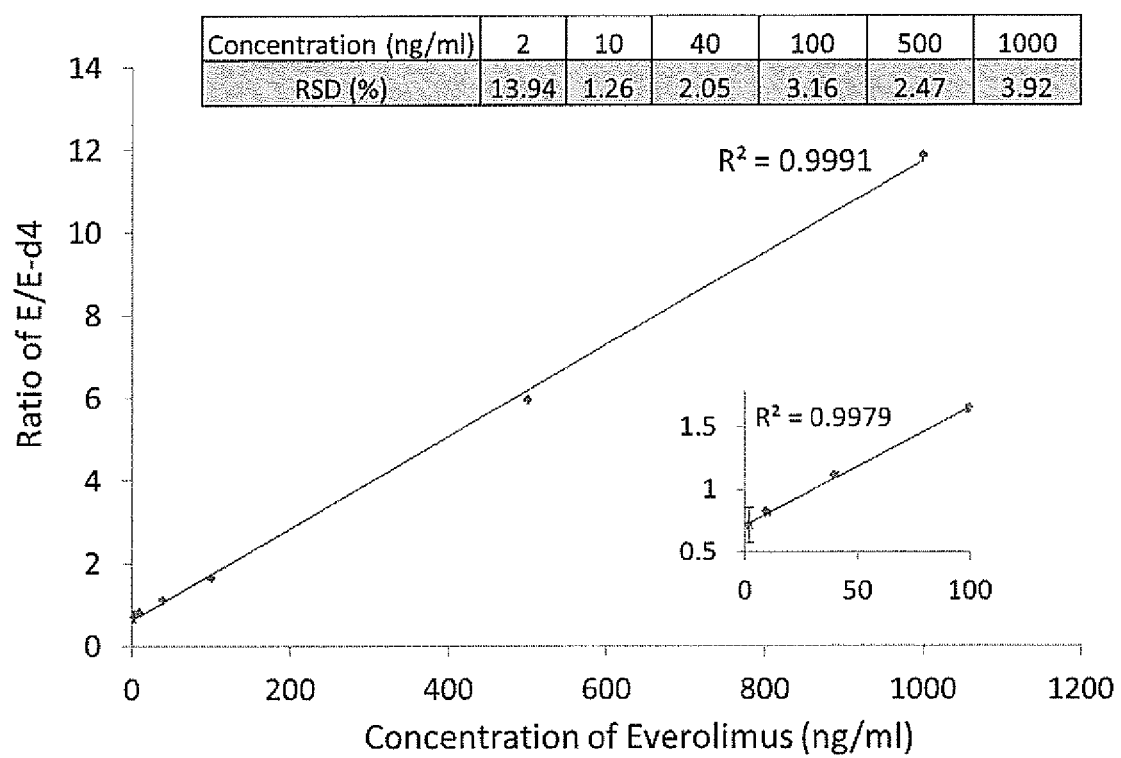
FIG. 7 is a quantitative calibration curve showing the ratio of everolimus/everolimus-d4 in blood with paper spray ionization over a range of concentrations.

FIG. 7 is a quantitative calibration curve showing the ratio of everolimus/everolimus-d4 in blood using a paper spray ionization source. A set of experiments were conducted to explore the improvement of RSD using the inventive aspects described herein. A series of dried blood samples containing the internal standard everolimus-d4 at 10 ng/ml but the analyte everolimus at different concentrations from 2 to 1000 ng/ml were analyzed to develop a calibration curve for quantitation as shown. 10 ul blood was applied to the PaperSpray® cartridge and air-dried for up to 2 h. Pure methanol of 100 µl, 30 µl, and 20 µl were then applied to the paper to elute compounds from the matrix at time=0 minutes, 5 minutes, and 8 minutes, respectively. DBS on each PaperSpray cartridge was analyzed for approximately 10 minutes with multi applications of organic solvent. The spray voltage was 4.5 kV. Error bars were plotted but may not be seen until zoomed in.

Still referring to FIG. 7, ion abundance of product ions of 389.25, 409.25, 427.25, 441.25, 453.17, 459.25, 485.25, 518.25, 564.25, 582.33, 596.33, 614.33, 651.42, 686.33, 747.5, 775.5, 793.5, 807.5, 819.5, 930.58, 948.58, and 952.58 were added up to represent the abundance of everolimus. Ion abundance of product ions of 393.25, 409.25, 427.25, 441.25, 453.17, 459.25, 485.25, 522.25, 564.25, 582.33, 596.33, 614.33, 655.42, 690.33, 751.5, 779.5, 797.5, 811.5, 823.5, 934.58, 952.58, and 956.58 were added up to represent the abundance of everolimus-d4. For each point in the curve, three samples were analyzed and the everolimus/everolimus-d4 ratios were calculated by dividing the ion abundance of everolimus by the ion abundance of everolimus-d4. The calibration curve was linear over the range from 2 ng/ml to 1000 ng/ml. More significantly, RSD values across the whole range were less than 15%. The RSD values of concentrations of 10, 40, 100, 500, and 1000 ng/ml were less than 4%.

The advantages of the present invention include higher efficiency of sample utilization. Multiple precursor ions of different m/z can be analyzed with a single ion injection event giving improved precision for quantitative measurements. Other advantages of the present invention include the ability to practice the invention on simple, low cost, hardware configurations such as a single linear ion trap mass spectrometer.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A method of operating an ion trap mass analyzer for quantification of analytes in a sample, comprising:
 a. introducing sample ions into the ion trap mass analyzer in a single injection event, the sample ions including first precursor ions having a first mass-to-charge ratio (m/z) and second precursor ions having a second m/z;
 b. concurrently isolating the first precursor ions and the second precursor ions;
 c. fragmenting the first precursor ions, but not the second precursor ions, to generate first product ions;
 d. performing a first scan to mass-selectively detect the first product ions and acquire a first mass spectrum including the first product ions, wherein an endpoint of the first scan is set such that the second precursor ions are retained in the ion trap mass analyzer;
 e. fragmenting the second precursor ions to generate second product ions; and
 f. performing a second scan to mass-selectively detect the second product ions and acquire a second mass spectrum including the second product ions.

2. The method of claim 1 further comprising determining an amount of the analyte in the sample using a relationship between intensities of the product ions in the first mass spectrum and the second mass spectrum.

3. The method of claim 1 wherein the first precursor ions are analyte precursor ions, and the second precursor ions are internal standard precursor ions.

4. The method of claim 1 wherein the first precursor ions are internal standard ions, and the second precursor ions are analyte precursor ions.

5. The method of claim 1 further comprising applying a notched waveform to concurrently isolate the first precursor ions and the second precursor ions from any background ions.

6. The method of claim 1 wherein the fragmenting is carried out using ion trap collision-induced dissociation (CID).

7. The method of claim 1 wherein an RF amplitude is scanned from a first point to an endpoint to eject the first product ions to the detector.

8. The method of claim 1 wherein an RF amplitude is scanned from a first point to another endpoint to eject the second product ions to the detector.

9. An ion trap mass spectrometer system for quantification of analytes in a sample, comprising:

a. an ion source configured so as to generate sample ions, the sample ions including first precursor ions having a first mass-to-charge ratio (m/z) and second precursor ions having a second m/z;
b. an ion trap mass analyzer positioned to receive the sample ions, the ion trap mass analyzer having a controller programmed to apply voltages to the ion trap mass analyzer to cause the ion trap mass analyzer to performs steps of: concurrently isolating the first precursor ions and the second precursor ions; and to fragment the first precursor ions, but not the second precursor ions, to generate first product ions.

10. The system of claim 9 further comprising a notched waveform to concurrently isolate the first precursor ions and the second precursor ions from any background ions.

11. The system of claim 9 wherein the fragmented first precursor ions and the fragmented second precursor ions are produced through collision-induced dissociation (CID).

12. The method of claim 1 wherein the analytes in the sample are quantified using a single ion trap mass analyzer.

13. The system of claim 9 wherein the ion trap mass analyzer is a single ion trap mass analyzer.

\* \* \* \* \*